Patented Apr. 22, 1924.

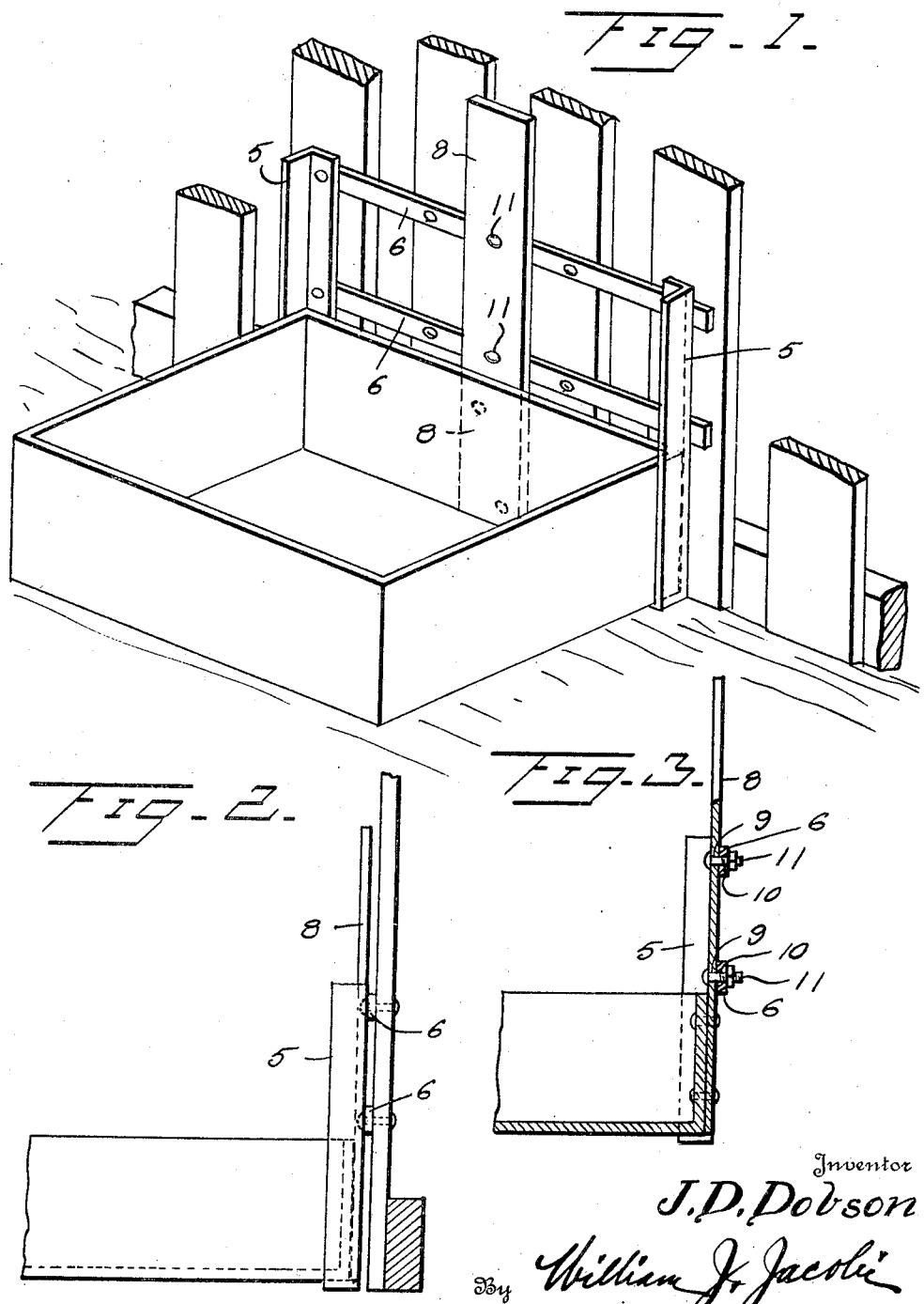

1,491,225

UNITED STATES PATENT OFFICE.

JOHN D. DOBSON, OF CEDAR RAPIDS, NEBRASKA.

ANIMAL DRINKING TROUGH.

Application filed December 12, 1922. Serial No. 606,501.

*To all whom it may concern:*

Be it known that JOHN D. DOBSON, a citizen of the United States, residing at Cedar Rapids, in the county of Boone and State of Nebraska, has invented certain new and useful Improvements in Animal Drinking Troughs, of which the following is a specification.

My invention relates to animal drinking troughs and its principal object is to provide a drinking trough adapted for use in swine farrowing pens, so mounted as to prevent the same being turned over by the feverish sows.

A further object of the invention is to provide a drinking trough which is mounted in a new and improved manner and can be readily removed from its mounting for the purpose of cleaning or refilling the same.

With the preceding and other objects and advantages in mind the invention consists in the novel combination of elements, constructions and arrangement of parts and operations to be hereinafter specifically referred to, claimed and illustrated in the accompanying drawing, wherein—

Figure 1 is a perspective of my improved drinking trough arranged in operative position.

Figure 2 is a side elevation of the support or mounting for the trough, and

Figure 3 is a detail view showing the removable fastening between the trough and support.

Referring to the drawing in detail wherein corresponding characters of reference denote corresponding parts throughout the several views, the numeral 5 designates a pair of vertically arranged angle irons connected by horizontal cross bars 6 and closed at their lower ends, the latter being adapted to be attached to the swine pen as shown in Fig. 1. The trough consists of a rectangular casing or receptacle having one pair of its corners slidably arranged in the vertically arranged angle irons. Extending vertically from one of the walls of the trough is an upstanding bar 8 the latter being disposed centrally of the ends of the trough.

This bar 8 lies against the horizontal cross bars 6 and is provided with openings 9 registering with similar openings 10 in these cross bars to receive pins 11. When it is desired to remove the trough the pins 11 are removed and the trough raised vertically from the angle irons.

From the disclosure it will be seen that I have provided a simple and inexpensive drinking trough that can be installed in a comparatively small space.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to secure by Letters Patent is:—

1. A drinking trough comprising a pair of vertically arranged angle irons, a pair of cross bars connected with the same and adapted to be connected with a support, a trough slidably arranged in said angle irons, a bar carried thereby and adapted to be detachably connected with the cross bars.

2. A device of the class described comprising a pair of vertically arranged and spaced apart angle irons having the lower ends thereof closed, cross bars connecting said angle irons and provided with openings therein, a trough having a pair of its corners slidably received in the angle irons and adapted to rest on the closed ends thereof, an upstanding bar carried by the trough and provided with openings adapted for registration with the openings in said cross bars, and a removable pin extending through said registering openings to lock the trough in adjusted position.

In testimony whereof I affix my signature.

JOHN D. DOBSON.